US006644896B2

(12) United States Patent
Iinuma

(10) Patent No.: US 6,644,896 B2
(45) Date of Patent: Nov. 11, 2003

(54) REPLACEMENT BLADE BODIES FOR A SLOTTING MILLING CUTTER

(75) Inventor: Tomoyuki Iinuma, Niwa-gun (JP)

(73) Assignee: Kanefusa Kabushiki Kaisha, Aichi (JP)

( * ) Notice: Subject to any disclaimer, the term of this patent is extended or adjusted under 35 U.S.C. 154(b) by 0 days.

(21) Appl. No.: 10/113,971

(22) Filed: Mar. 28, 2002

(65) Prior Publication Data

US 2002/0102138 A1 Aug. 1, 2002

Related U.S. Application Data

(62) Division of application No. 09/600,024, filed on Jul. 7, 2000, now abandoned.

(30) Foreign Application Priority Data

Jan. 9, 1998 (JP) ........................................ 10-15126

(51) Int. Cl.[7] .............................. B23C 5/20; B26D 1/12
(52) U.S. Cl. ............................................ 407/42; 407/47
(58) Field of Search ............................ 407/42, 70, 113, 407/114, 115, 116, 117, 118, 119; 144/234, 91.2

(56) References Cited

U.S. PATENT DOCUMENTS 362,625 A * 5/1887 Hewit ........................ 144/229
1,718,325 A * 6/1929 Weaver ...................... 144/234
2,449,605 A * 9/1948 Kelton ....................... 144/230
4,068,688 A * 1/1978 Benson ...................... 144/91.2
4,205,932 A * 6/1980 Tennutti ...................... 407/25
5,005,619 A * 4/1991 Jensen ........................ 144/230
5,116,694 A * 5/1992 Tsukada et al. ............. 429/698
5,368,078 A * 11/1994 Rupe .......................... 144/234
5,924,825 A * 7/1999 Schwab et al. ............... 407/42
6,161,602 A * 12/2000 Erbs .......................... 144/91.2
6,379,798 B1 * 4/2002 Yazaki ....................... 428/408

* cited by examiner

*Primary Examiner*—A. L. Wellington
*Assistant Examiner*—Dana Ross
(74) *Attorney, Agent, or Firm*—Koda & Androlia

(57) ABSTRACT

A milling cutter for slotting which is provided with a blade body structure capable of producing, without sacrificing strength, an excellent quality of durable film by physical deposition method also on the side flank of a projected cutting blade near the bottom or the outside flank of a bottom edge and comprises blade bodies (22) with a plurality of projected cutting blades (24) disposed in comb shape which are installed on a cutter body (20) at specified pitches in the circumferential direction and a bottom edge (32) formed on the same surface as the cutting face (28) of the projected cutting blade at the bottom between the projected cutting blade and its adjacent projected cutting blade, characterized in that a bottom groove (38) having a with of 90 to 100% of the width of the bottom edge (32) is formed so that the bottom edge is cut off and then the blade bodies are coated with hard film and also a bottom groove having a width of 70 to 100% of the width of the bottom edge is formed at an attack angle of 0° to 105° so that the bottom edge is cut off and then the blade bodies (22) are coated with hard film.

1 Claim, 12 Drawing Sheets

(1)

(2)

A - A (3)

(1)

(2)
B - B (3)

(1)

(2)

REPLACEMENT BLADE BODIES FOR A SLOTTING MILLING CUTTER

This is a Divisional Application of application Ser. No. 09/600,024, filed Jul. 7, 2000, now abondoned.

TECHNICAL FIELD

This invention relates to a slotting milling cutter, more specifically to an improved slotting milling cutter typified, for example, by a finger joint cutter for cutting a plurality of fingers at end portions of wood planks.

BACKGROUND ART

Finger joint is widely put in practical uses as means for joining a plurality of wood planks at their ends. The finger joint refers to a technique of forming a plurality of mountain range portions 12 at an end portion of each wood plank 10 as shown in FIG. 15, and then opposing the mountain range portions 12 of one wood plank 10 to those of another wood plank 10, followed by compression of these two wood planks 10 against each other to achieve fitting engagement, as shown in FIG. 16. These mountain range portions 12 are called fingers because of their shapes, and a slotting milling cutter for forming such fingers is generally referred to as a finger joint cutter. Incidentally, a suitable adhesive is applied to the mountain range portions 12 of wood planks 10 before they are fitted to each other.

Generally, a finger joint cutter essentially consists of a cutter body to be inserted and fixed to a spindle of a finger cutting machine and a plurality of projected cutting blades arranged at intervals, for example, with a center angle of 90° on the circumference of the cutter body to protrude radially outward. The pluralities of projected cutting blades are arranged in the axial direction of the cutter body in a comb shape. Each projected cutting blade is composed of a pair of tapered faces. The projected cutting blades assuming a comb shape are designed to have a profile as a whole such that they can cut a fingered portion (mountain range portions) 12 as shown in FIG. 15.

While the finger joint cutter described above is of the type where the projected cutting blades are fixed integrally to the cutter body, there is also practiced a blade replaceable type having projected cutting blades attached removably thereto. FIG. 11 shows such blade replaceable type finger joint cutter, in which blade bodies 22 are arranged on the circumference of a cutter body 20 at predetermined pitches (at equal pitches or unequal pitches) and are removably fixed by bolts 23 respectively. Each blade body 22 has a plurality of projected cutting blades 24 formed in a comb shape parallel to the thickness, as shown in FIG. 12. That is, in the blade replaceable type finger joint cutter, the blade bodies 22 having projected cutting blades 24 each formed in a comb shape are designed to be detached from the cutter body 20 for replacement. The replaceable blades include right-side blade bodies 22 and left-side blade bodies 22 which are used separately depending on the kind of finger joint cutter. Provided that the pitch between tips of two adjacent fingers in the fingered portion 12 (see FIG. 15) is p, projected cutting blades 24 are formed at pitches 2*p* in a right-side blade body 22. While projected cutting blades 24 are also formed at pitches 2*p* in a left-side blade body 22, the blades 24 in the left-side blade body 22 are shifted by 1*p* leftward parallel to the thickness of the cutter body 20 with respect to the right-side blade body 22. Right-side blade bodies 22 and left-side blade bodies 22 are arranged alternately on the circumference of the cutter body 20. However, in the finger joint cutters shown in FIGS. 11 and 12, the right-side blade bodies 22 and the left-side blade bodies 22 are of the same configuration, and the left-side blade bodies 22 are positioned on the circumference of the cutter body 20 to be shifted leftward by 1*p* (1 pitch) thicknesswise with respect to the right-side blade bodies 22. In other words the blade bodies 22 shown in FIGS. 11 and 12 serve both as left-side blade bodies and right-side blade bodies.

The present invention relates to a blade body structure for forming an excellent film by physical vapor deposition (PVD) on a blade body 22 in a finger joint cutter. First, problems inherent in the prior art and special terms frequently appear in detailed description of the invention will be described. FIG. 13 is a perspective view of the blade body 22 viewed against the rotational direction thereof, and FIG. 14 is a perspective view of the blade body 22 viewed in the rotational direction thereof. In FIG. 13, the reference number 26 denotes a cutting edge in a projected cutting blade 24, and the reference number 28 denotes a rake face in the blade body 22. Side faces of the projected cutting blades 24 excluding the cutting edges 26 and the rake faces 28 are referred to as side flanks 30. Bottom edges 32 are formed at troughs present between one projected cutting blade 24 to be on the same plane as the rake faces 28 of the projected cutting blades 24 are formed. Further, slant bottom faces located at troughs of projected cutting blades 24 and formed contiguous to side flanks 30 of each opposing pair of cutting blades are referred to as major flanks 34. It should be noted here that there are cases where the bottom edges 32 have no sharp cutting edges. For example, when end faces of finger tips are to be formed using a finger joint cutter, the bottom edges need cutting edges. However, cutting edges are not necessary in the bottom edges when end faces of wood planks are cut beforehand using a circular saw to form finger tip end faces without cutting end faces of the finger tips using the finger joint cutter.

While blade bodies 22 of finger joint cutters are generally made of a hard material such as a high speed tool steel and a cemented carbide, there is supposed those having steel materials as bases to which such hard materials are joined. A technique is recently put into practice in order to increase durability of cutting edges in projected cutting blades 24. According to this technique, a hard film such as of titanium (Ti) compound and chromium (Cr) compound is formed by physical vapor deposition (PVD) on the flanks along the cutting edges. However, a blade body 22 having a complicated configuration with a plurality of projected cutting blades 24 in a comb shape as shown in FIG. 12 involves a problem in that it is difficult to form an excellent film uniformly by means of PVD. That is, in FIGS. 13 and 14, films to be formed on the side flanks 30 located between every opposing two projected cutting blades 24 and on the major flanks 34 around intersections of the side flanks 30 with the major flanks 34 of the bottom edges are porous or very thin and have extremely low adhesion. This is because excellent films are formed on the tips of the projected cutting blades 24 to make ions to be deposited hard to run through the clearances between the projected cutting blades to reach to the vicinities of the intersections.

While the rake faces 28 of the blade body 22 are sharpened in order to sharpen the cutting edges 26, there is pointed out a problem that the films come off during this treatment at such portions having films formed thereon with poor adhesion as described above. Even if a fingered portion 12 as shown in FIG. 15 is machined with a finger joint cutter to which blade bodies 22 having such durable films with poor adhesion are attached, the blade bodies 22 do not show sufficient durability, and the cutting edges 26 near the trough of the blade bodies 22 or those of the bottom edges 32 are dulled soon. The portions near the troughs of the projected cutting blades 24 perform machining of portions around the tips on the tapered faces of the fingered portion 12, and if such portions come to have poor cutting performance, the finger tips of the fingered portion 12 come to have finished thickness greater than a design specification, as shown in FIG. 17. Such fingered portions 12 having inaccurate tapered faces involve a significant problem in that, when they are engaged with each other, as shown in FIG. 18, the finger tips of the fingered portion 12 fail to reach the troughs of the counter part, and that the tapered faces cannot be brought into intimate contact with one another to cause reduction in the jointing strength. In this case, adhesion of the films formed on the portions which participate in machining by the cutting edges 26 can be improved somewhat by forming deeper troughs. However, it gives rise to a problem that the strength of the projected cutting blades 24 is lowered, since projection of the projected cutting blades 24 having originally a small thickness is increased.

The present invention is proposed in order to solve the problems inherent in the prior art as described above, and it is an objective of the present invention to provide a blade structure in which excellent durable films can be formed by means of physical vapor deposition (PVD) on the side flanks of the projected cutting blades near the troughs thereof or on the major flanks of the bottom edges without sacrificing the strength of the blades.

DISCLOSURE OF THE INVENTION

In order to overcome the problems described above and to attain successfully the intended objective, the slotting milling cutter according to one aspect of the present invention contains blade bodies attached to a cutter body at predetermined pitches in the circumferential direction thereof, the blade bodies each having a plurality of projected cutting blades arranged in a comb shape, and bottom edges formed at troughs between the projected cutting blade and another projected cutting blade adjacent thereto on the same plane as rake faces of the projected cutting blades are formed; characterized in that bottom grooves having a width of 90 to 100% of that of the bottom edges are defined by cutting off the bottom edges, and then the blade bodies are coated with hard films. In this case, the bottom grooves having a width of 90 to 100% of that of the bottom edge are defined preferably from the rake faces in the bottom edges toward major flanks of the bottom edges respectively.

Meanwhile, in order to overcome also the problems described above and to attain successfully the intended objective, the slotting milling cutter according to another aspect of the present invention contains blade bodies attached to a cutter body at predetermined pitches in the circumferential direction thereof, the blade bodies each having a plurality of projected cutting blades arranged in a comb shape, and bottom edges formed at troughs between the projected cutting blade and another projected cutting blade adjacent thereto on the same plane as rake faces of the projected cutting blades are formed; characterized in that bottom grooves having a width of 70 to 100% of that of the bottom edge are defined by cutting off the bottom edges with an attack angle of 0° to 105°, and then the blade bodies are coated with hard films. In this case, the bottom grooves having a width of 70 to 100% of that of the bottom edges are defined preferably from the rake faces in the bottom edges toward major flanks thereof, respectively. It should be noted here that the attack angle referred to herein means the angle formed by the slant face of the bottom groove with respect to the rake face.

BEST MODE FOR CARRYING OUT THE INVENTION

The slotting milling cutter according to the present invention will now be described by way of a preferred embodiment referring to the attached drawings. It should be noted here that while there is described a blade replaceable type milling cutter in which blade bodies 22 are removably attached to a cutter body 20 in the embodiment, it is of course possible to apply this embodiment to the so-called solid type milling cutters having blade bodies 22 brazed to a cutter body 20.

Figure 1:
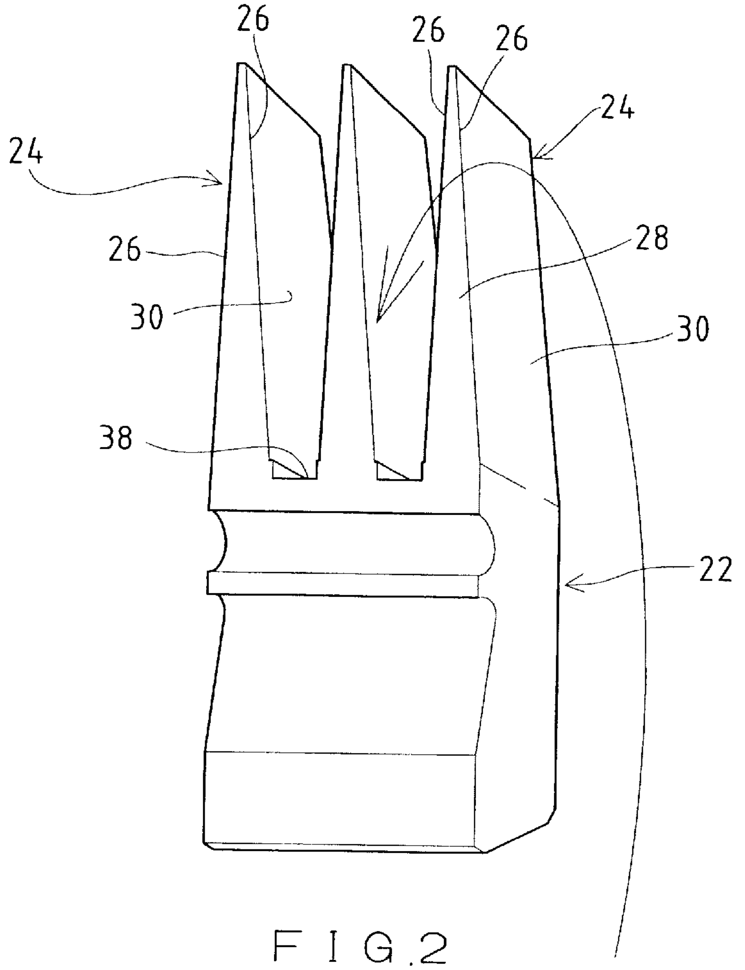
FIG. 1 is a perspective view of a blade body according to a preferred embodiment of the present invention viewed against the rotational direction thereof.
Figure 2:
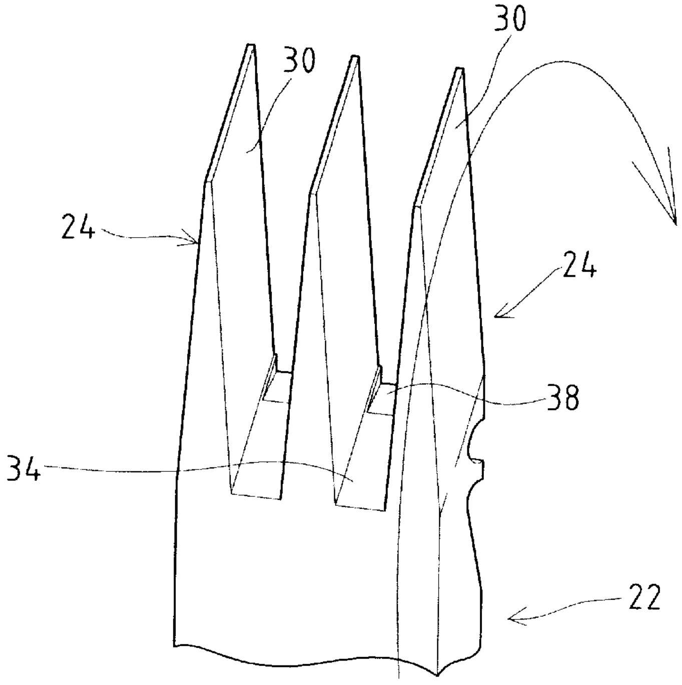
FIG. 2 is a perspective view of the blade body shown in FIG. 1 viewed in the rotational direction thereof.
Figure 3:
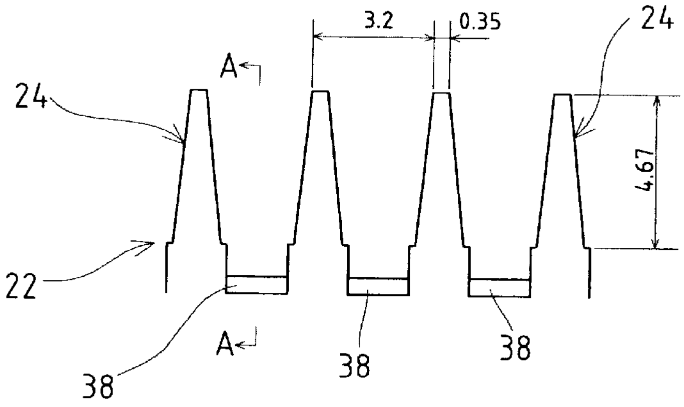
FIG. 3 shows schematic drawings explaining a micro finger joint cutter, in which FIGS. 3(1), 3(2) and 3(3) show a front view, a view taken along the line A—A in FIG. 3(1) and an enlarged partial view around a trough, respectively.
Figure 3:
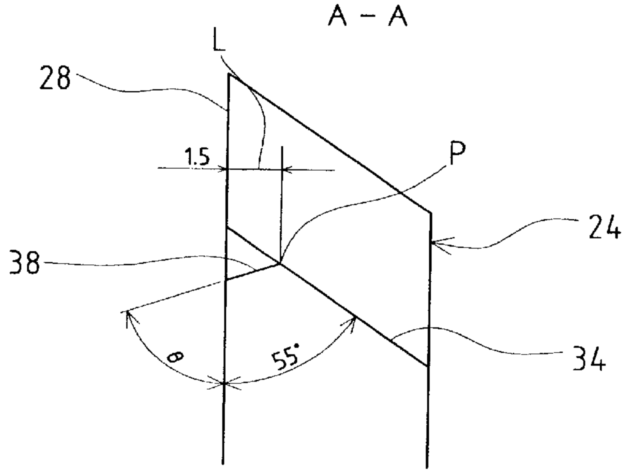
Figure 3:
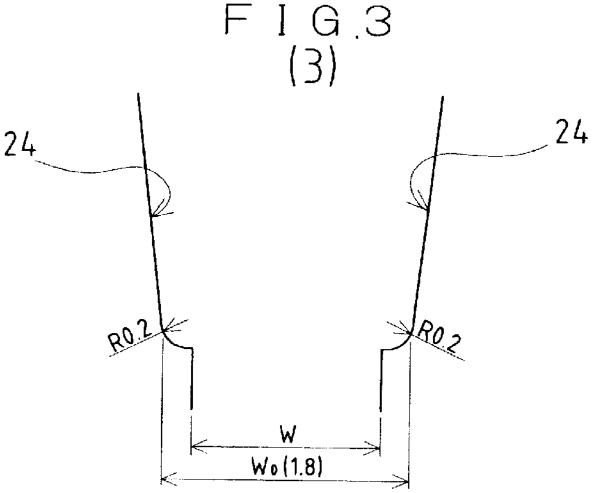

FIGS. 1 and 2 show a blade body 22 as a preferred embodiment to which the present invention is applied. That is, a bottom groove 38 is formed in a bottom edge 32 located at a trough between adjacent two projected cutting blades 24. The bottom groove 38 has a width of 90 to 100% of that of the bottom edge 32 and is formed by cutting off substantially the central zone of the bottom edge 32. Further, as shown in FIGS. 3(2) and 4(2), a bottom groove 38 having a width of 70 to 100% of the bottom edge 32 may be formed by cutting off substantially the central zone of the bottom edge 32 with an attach angle of 0° to 105°. The attack angle referred to here will be described in the following test examples.

TEST EXAMPLE 1

Influence of Attack Angle and Width of Bottom Groove

FIG. 3(1) shows a front view of a micro finger joint cutter having short projected cutting blades 24. The projection height of each blade 24 is 4.67 mm, and the span between the apex centers of the adjacent two blades 24 is 3.2 mm. In this finger joint cutter, a bottom groove 38 is formed in each bottom edge 32 located between every two adjacent two blades 24 diagonally toward an major flank 34. This bottom groove 38 is a slant face to be formed from a point p toward a rake face 28 in the bottom edge 32, as shown in FIG. 3(2), a view taken along the line A—A in FIG. 3(1). The point p is defined on the major flank 34 as a starting point set back by the distance L parallel from the rake face 28 toward the rear side of the blade 24, and the angle θ formed by the slant face of the bottom groove 38 with respect to the rake face 28 is referred to as "the attack angle". Here, the distance L referred to above is 1.5 mm in FIG. 3(2). Meanwhile, FIG. 3(3) shows an enlarged partial view around the trough in the micro finger joint cutter, in which the width of the bottom groove 38 is expressed by W, provided that the maximum width of the trough between the adjacent two projected cutting blades 24 is $W_0$(1.8 mm). The maximum width $W_0$ shall be the distance between intersections of each cutting edge and each edge of the bottom edge 32 irrespective of the degree of rounding to be formed by connecting these ridges and edges.

Figure 4:
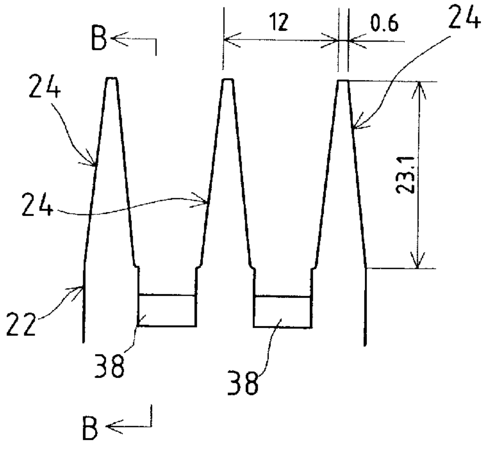
FIG. 4 shows schematic drawings explaining a long-finger joint cutter, in which FIGS. 4(1), 4(2) and 4(3) show a front view, a view taken along the line B—B in FIG. 4(1) and an enlarged partial view around a trough, respectively.
Figure 4:
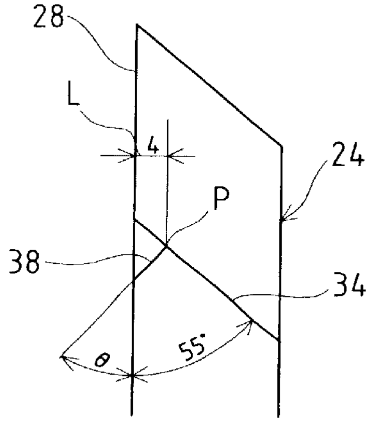
Figure 4:
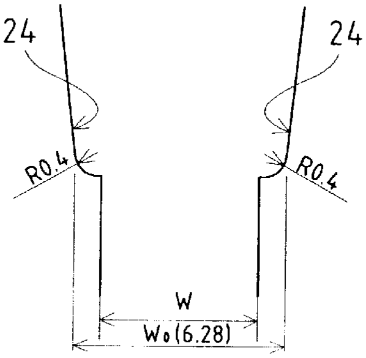

FIG. 4(1) is a front view of a long finger joint cutter having long projected cutting blades 24. The projection height of each blade 24 is 23.1 mm and the span between the apex centers of the adjacent two blades 24 is 12 mm. In this finger joint cutter, a bottom groove 38 is also formed in each bottom edge 32 located between the adjacent two blades 24 toward an major flank 34. This bottom groove 38 is a slant face to be formed from a point p toward a rake face 28 in the bottom edge 32, as shown in FIG. 4(2) a view taken along the line B—B in FIG. 4(1). The point p is defined on the major flank 34 as a starting point set back by the distance L (4 mm) parallel from the rake face 28 toward the rear side of the blade 24. Meanwhile, FIG. 4(3) shows an enlarged partial view around the trough of the long finger joint cutter, in which the width of the bottom groove 38 is expressed by W, provided that the maximum width of the trough between the adjacent two projected butting blades 24 is $W_0$(6.28 mm).

Figure 5:
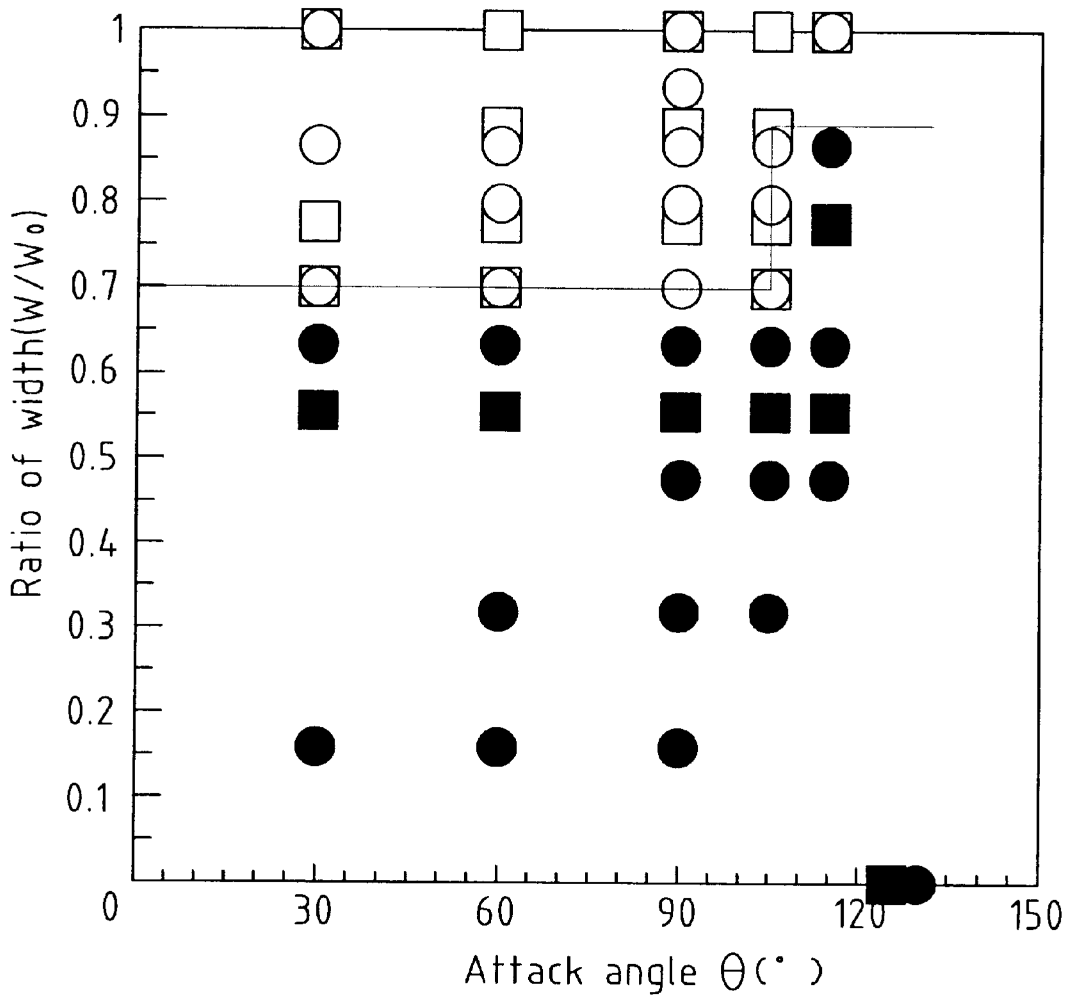
FIG. 5 is a graph referring to a finger joint cutter and showing evaluation of film formation when bottom grooves are formed on bottom edges of blade bodies and the blade bodies are coated with chromium nitride films at various attack angles θ and with various widths W in the bottom grooves by MES observation of the films near the troughs of the cutting edges.
Figure 6:
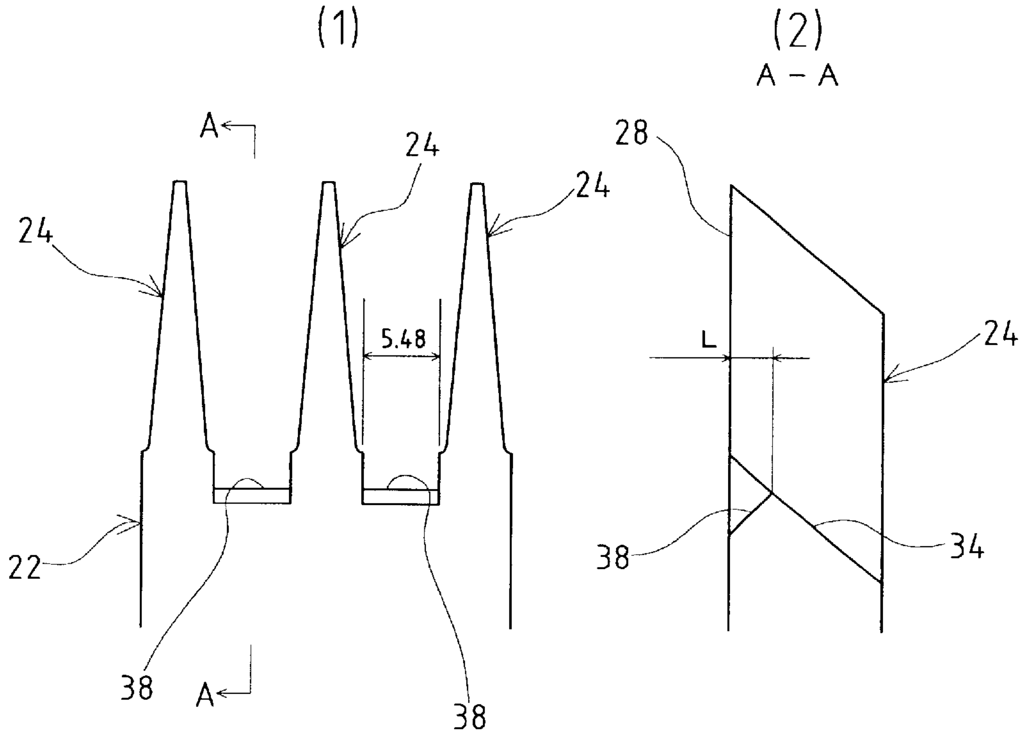
FIG. 6 shows schematic drawings schematically explaining a long-finger joint cutter employed in Test Example 2, in which FIGS. 6(1) and 6(2) show a front view and a view taken along the line A—A in FIG. 6(1) respectively.

For the micro finger joint cutter and the long finger joint cutter described above, bottom grooves 38 with attack angles θ and widths W were formed on the bottom edges 32 of the blade bodies 22 at various attack angles θ and with various widths W, and these blade bodies were coated with chromium nitride (CrN) by a PVD system. Cutting faces 28 of the coated blade bodies 22 were subjected to finish sharpening (the coating film was removed from the rake faces 28), and then the films formed around the troughs at the cutting edges 26 and on the bottom edges 32 were observed using an electron microscope to evaluate the quality of films thus formed. The results of evaluation are as shown in FIG. 5. In the graph shown in FIG. 5, the attack angle θ is taken on the abscissa, and the ratio of the width W of the bottom groove 38 to the maximum width $W_0$ of the trough ($W/W_0$) is taken on the ordinates. In the case where the ratio $W/W_0$ is 0.9 or more, the quality of the films around the troughs between the cutting edges 26 and on the bottom edges 32 were excellent (provided that $W/W_0<1$). Meanwhile, in the case where the attack angle θ is 0° to 105°, the quality of the films around the troughs between the cutting edges 26 and on the bottom edges 32 were excellent, when the ratio $W/W_0$ is 0.7 or more (provided that $W/W_0<1$). It should be noted here that the width W of the bottom groove 38 is the dimension on the rake face 28 after the sharpening treatment and that "an attack angle θ of 0°" means the state where the slant face of the bottom groove 38 is parallel to the rake face 28. The attack angle θ is preferably 10° or more so as to facilitate formation of bottom grooves 38.

TEST EXAMPLE 2

Influence of Attack Angle and Length in Bottom Groove

In the long finger joint cutter described above, the procedures of Test Example 1 were repeated analogously except that the attack angle θ and the length L of the bottom groove 38 were changed without changing the width W (5.48 mm) of the bottom groove 38, i.e. $W/W_0$ is fixed at 0.87). Here, the length L is the distance of a point set back parallel from the rake face 28 of the bottom edge 32 toward the rear side of the projected cutting blade 24. When the attack angle θ of the bottom groove 38 was changed without changing the length L (=1 mm) in the bottom groove 38, the films around the troughs of the cutting edges 26 and on the bottom edges 32 showed poor quality at attack angles of more than 105°. However, the films around the troughs of the cutting edges 26 and on the bottom edges 32 showed excellent quality at attack angles of 105° or less. These results agreed well with the results of Test Example 1.

Further, several examples of blade bodies 22 with various bottom groove lengths L were fabricated without changing the attack angle θ (=45°) in the bottom groove 38, followed successively by PVD treatment and finish sharpening, and these examples were also tested. When the quality of films were observed in the state where the length L became 0.14 to 1.40 mm after the finish sharpening of the rake face 28, the films around the troughs of the cutting edges 26 and on the bottom edges 32 showed excellent quality even if the length is very small (at least 0.14 mm).

TEST EXAMPLE 3

Attack Angle of Bottom Groove Vs. Film Thickness Distribution

Figure 7:
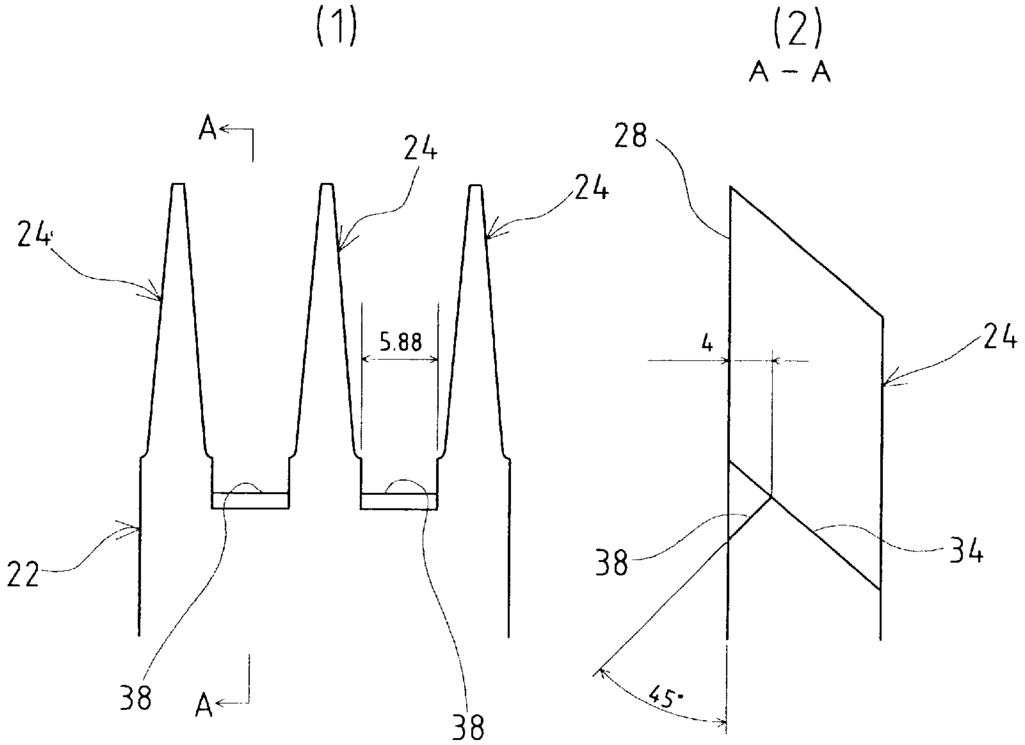
FIG. 7 shows schematic drawings explaining a long-finger joint cutter employed in Test Example 3 before subjected to re-sharpening treatment, in which FIGS. 7(1) and 7(2) show a front view and a view taken along the line A—A in FIG. 7(1) respectively.
Figure 8:
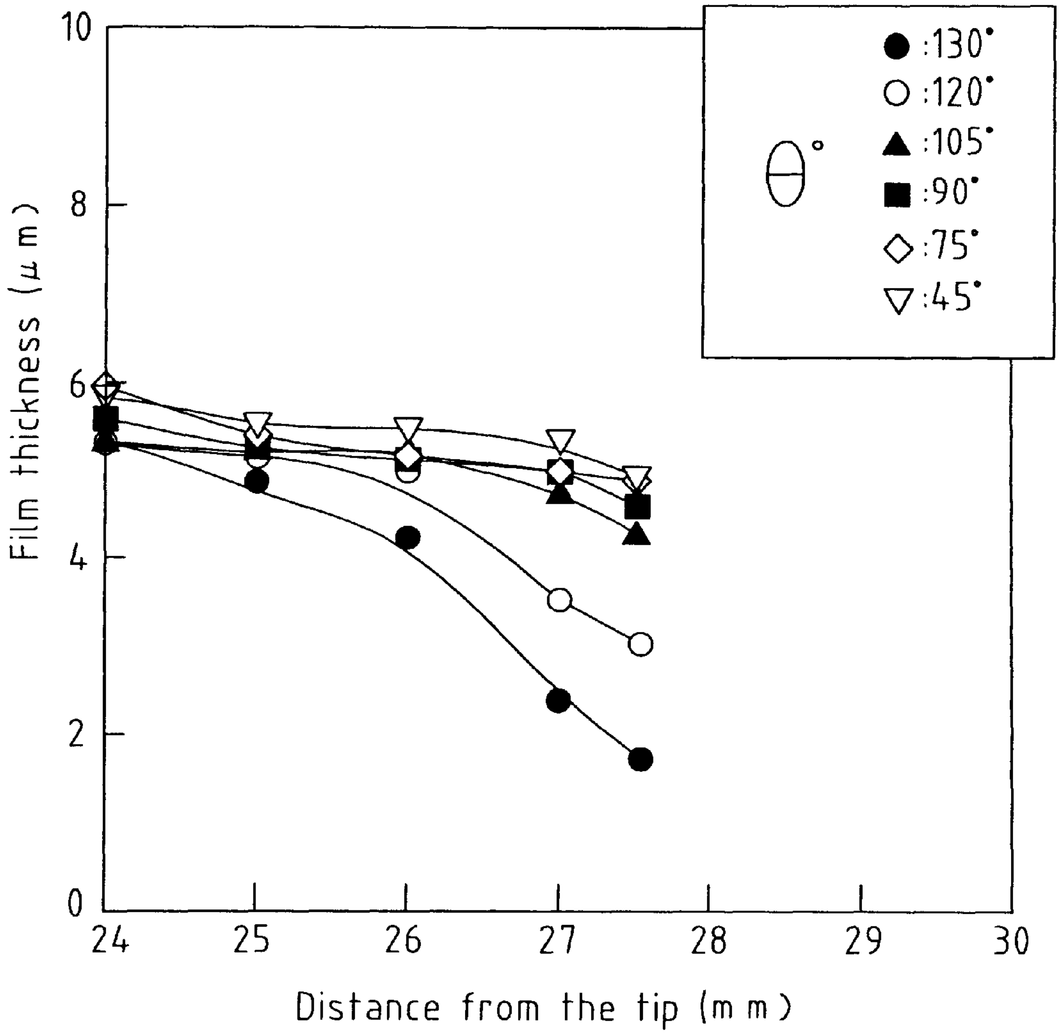
FIG. 8 is a graph showing a film thickness distribution at the cutting edges after the final re-sharpening treatment in Test Example 3.

Since blade bodies 22 of a finger joint cutter undergo abrasion with service time, they are subjected to re-sharpening treatment several times and are recycled repeatedly in practical uses. Assuming that a final loss of the rake face 28 to be caused by repeated re-sharpening is 3 mm, film thickness distribution in the cutting edges 26 in the final re-sharpening treatment was examined. The conditions of Test Example 2 were used except that the attack angle was fixed at 45° and $W/W_0$=0.94. The state of the blade body 22 before re-sharpening is shown in FIG. 7. The width W of the bottom groove 38 was designed to be unchanged even after the rake face 28 is retracted finally by 3 mm by re-sharpening treatments. Film thickness distribution in the cutting edges 26 after the final re-sharpening treatment is shown in FIG. 8. In the graph shown in FIG. 8, the vertical distance measured from the tip of a side cutting blade toward the trough in FIG. 7 is taken on the abscissa as "Distance from the tip (mm)", and "Film thickness ($\mu$m)" is taken on the ordinates. The graph shows that the film thickness decreases steeply toward the bottoms at attack angles of more than 105°.

ANALYSIS

Depth of Bottom Groove vs. Concentration of Stress Against Lateral Load

Figure 9:
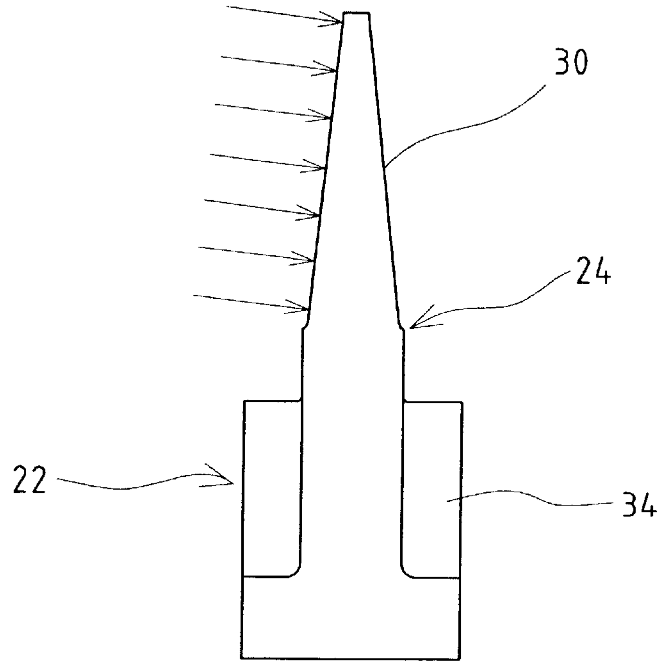
FIG. 9 shows schematic drawings explaining a model projected cutting blade subjected to an FEM analysis, in which FIGS. 9(1) and 9(2) show a front view where uniform load is applied perpendicularly against a tapered face of the projected cutting blade and a perspective front view of the cutting blade respectively.
Figure 9:
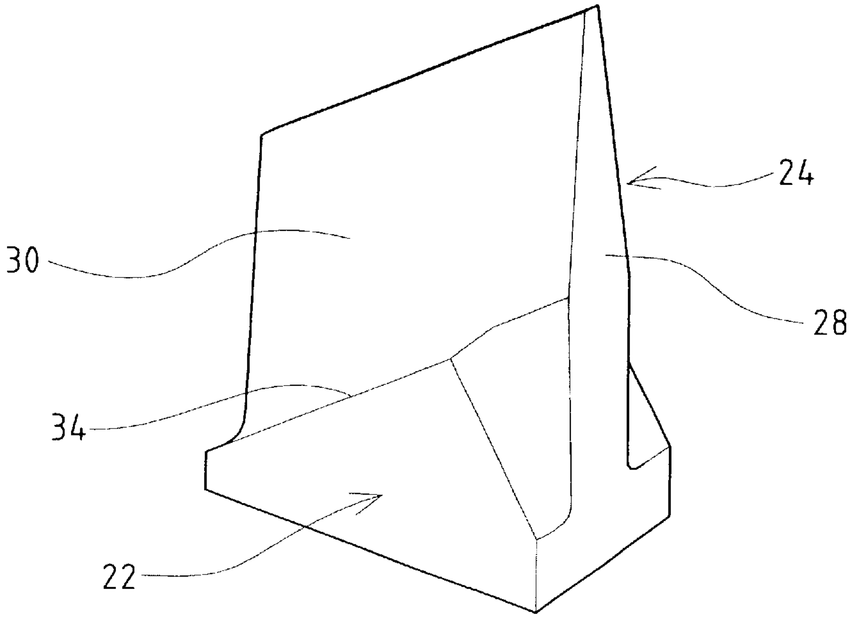
Figure 10:
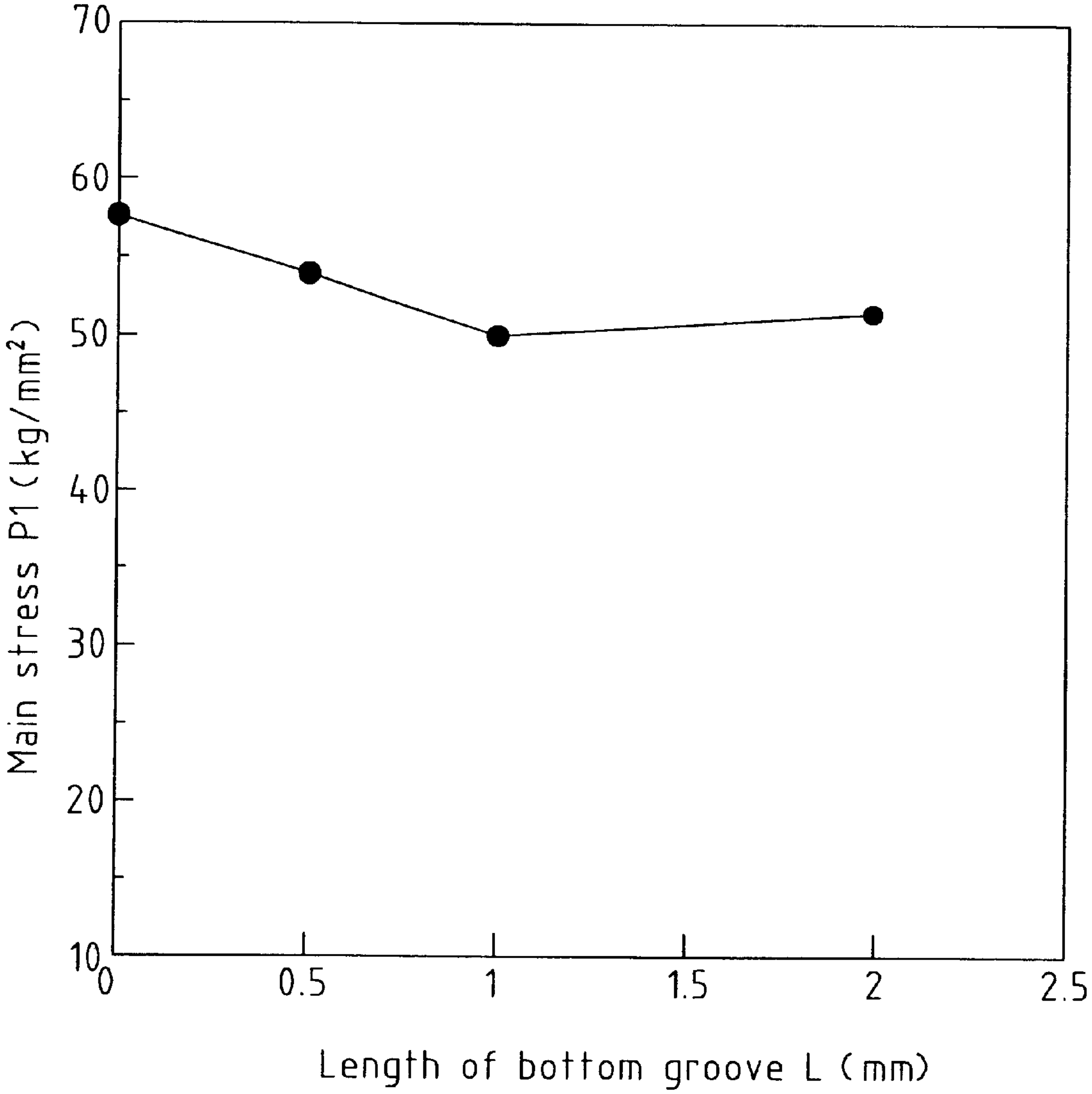
FIG. 10 is a graph showing variation in the main stress in the analysis when the length of the bottom grooves was changed without changing the attack angle of the bottom groove (θ=30°) and $W/W_0$=0.94.
Figure 11:
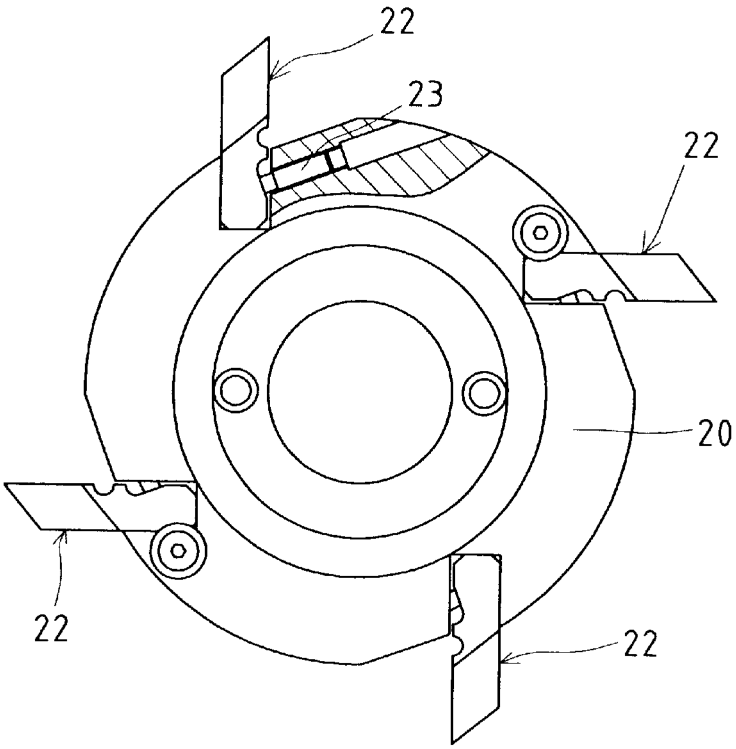
FIG. 11 is a plan view showing an example of replaceable blade type finger joint cutter in which blade bodies are adapted to be attached removably to the circumference of a cutter body at predetermined pitches removably by bolts.
Figure 12:
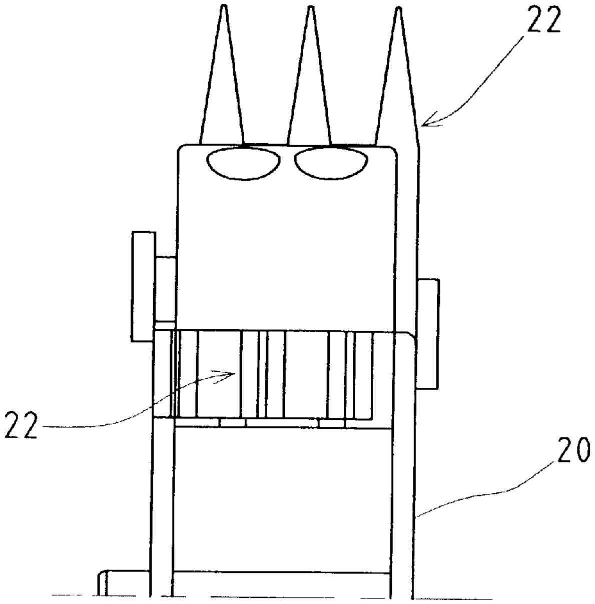
FIG. 12 is a right side view of an upper half of the finger joint cutter shown in FIG. 11, showing a state where a plurality of projected cutting blades are formed in a comb shape.
Figure 13:
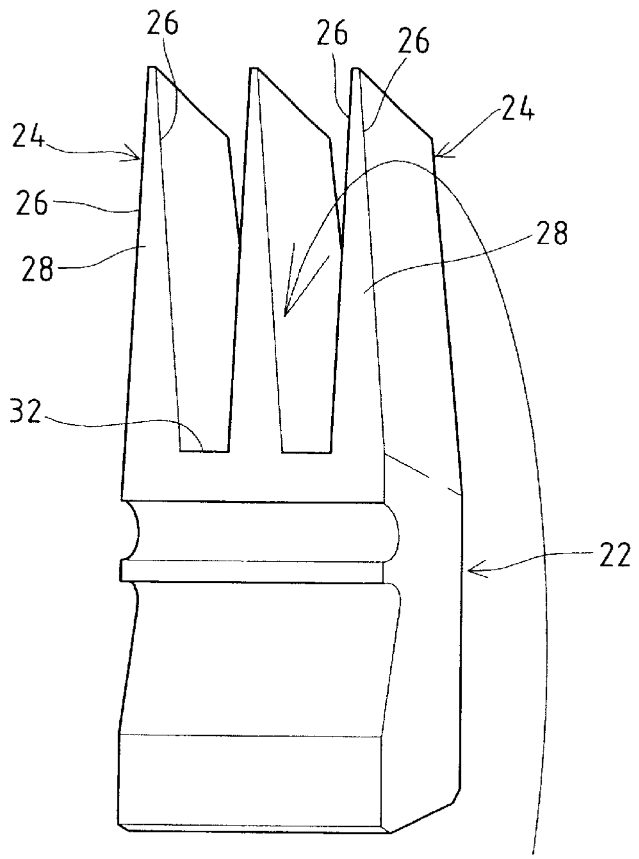
FIG. 13 is a perspective view of a blade body of the prior art viewed against the rotational direction thereof.
Figure 14:
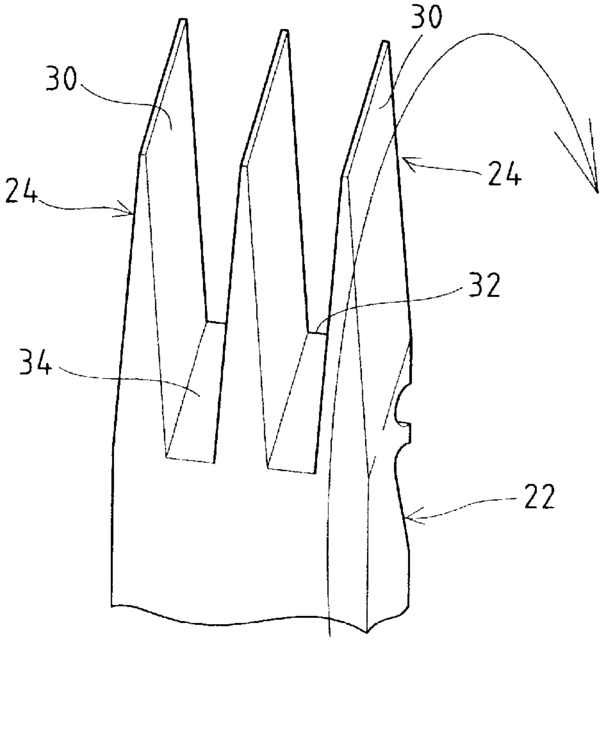
FIG. 14 is a perspective view of the blade body shown in FIG. 13 viewed in the rotational direction thereof.
Figure 15:
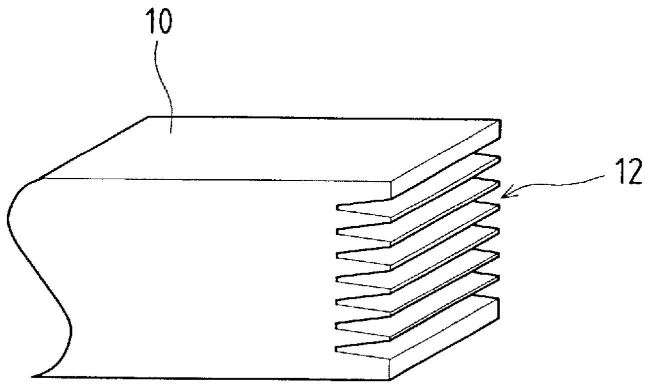
FIG. 15 is a perspective view showing a state where a plurality of mountain range portions (a fingered portion) are formed at an end of a wood plank.
Figure 16:
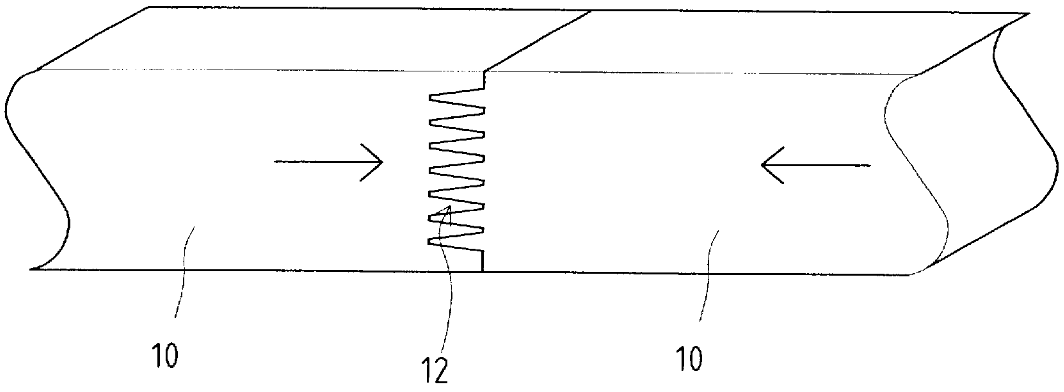
FIG. 16 is a perspective view showing a state where a pair of wood planks each having fingers are opposed to each other at the fingered ends and are compressed against each other to achieve so-called finger joint.
Figure 17:
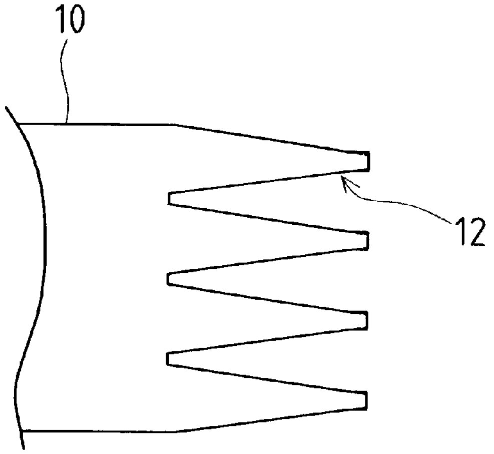
FIG. 17 is a plan view of fingers formed in a wood plank by machining with a finger joint cutter having blade bodies with poor durable films, in which the finger tips of the fingered portion are finished to be thicker than a designed value.
Figure 18:
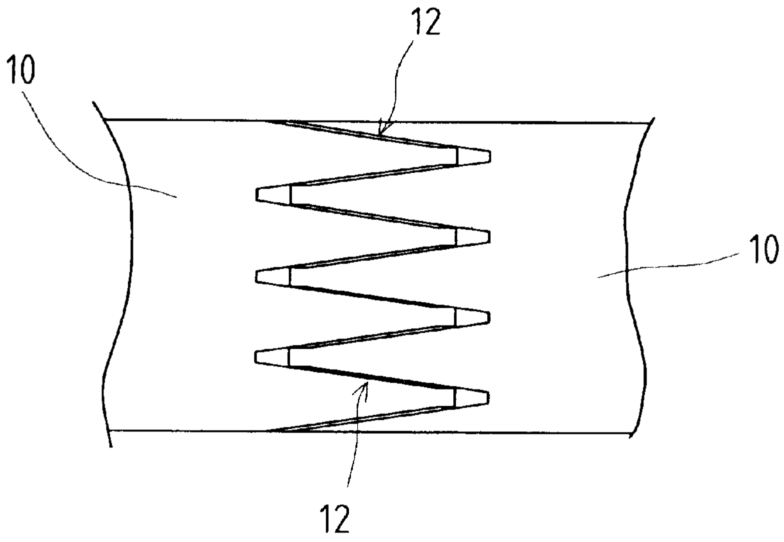
FIG. 18 is a plan view showing a state where a pair of wood planks each having a fingered portion as shown in FIG. 17 are opposed to each other at the fingered ends and are jointed, and where the finger tips of the fingered portion in one wood plank failed to intrude into troughs in the other wood plank, preventing the tapered faces from being brought into intimate contact with those of the counterpart.

Particularly in the case of a micro finger joint cutter, when projected cutting blades 24 undergo a great lateral load, for example, when they are cutting knots, the cutting blades 24 can generally chip off from the bottom. Therefore, a model of finite-element method (FEM) analysis is shown in FIG. 9. As shown in FIG. 9(1), it was assumed that a uniform load of 1 kgf/mm is applied perpendicular to a tapered cutting edge of a projected cutting blade 24. Results of test carried out by changing the length L of the bottom groove 38 without changing the attack angle θ (=30°) and the $W/W_0$ ratio (=0.94) are shown in FIG. 10. In the graph shown in FIG. 10, the length L (mm) of the bottom groove 38 is taken on the abscissa and the main stress P1 (kgf/mm$^2$) is taken on the ordinates. This graph shows that the main stress P1 decreases as the length L of the bottom groove 38 becomes longer. This is because the stress concentrated definitely to around the intersections between each side cutting edge and each trough in the absence of bottom grooves 38 was distributed to the bottom grooves 38 thus defined to moderate the concentration of stress as a whole. In the case where the blade bodies 22 are of the replaceable blade bodies to be removably attached to the cutter body 20, since the distance from the rake face 28 of a projected cutting blade 24 to the rear side thereof (thickness of the replaceable blade) is relatively small, such effect of moderating stress concentration is exerted well in terms of the strength of the blade body 22.

As described above, since step-like protrusions are formed by defining bottom grooves on the peripheral franks of the bottom edges, ions to be deposited generated during the PVD treatment are attracted strongly by these protrusions, and thus excellent coating is deposited to cutting edges around these ridges. In the case where bottom grooves having a width of 100% of that of the bottom edge are defined, the deeper the bottom grooves, the easier becomes vapor deposition of films on the side flanks. While milling cutters having replaceable blade bodies as cutting parts were described in the embodiment, the present invention can be applied suitably to those milling cutters having cutting parts fixed to blade bodies by brazing and the like as mentioned before. While details with respect to the position of an electrode (evaporation source) in the PVD treatment and the like were not referred to in the embodiment, it was confirmed by repeated experiments that there is no significant difference in film formation even if the electrode is located on the rake face side or on the opposite side from the rake face side or on the tip side.

Further, in the embodiment illustrated in the drawings, while planar bottom grooves were formed from the rake faces at the bottom edges toward the major flanks thereof, they may be replaced with curved or bent bottom grooves. As described above, the attack angle θ of the case where curved or bent bottom grooves are formed shall be the angle defined by the rake face and a line connecting the end of the bottom groove on the rake face side with the end thereof on the major flank side.

Effect of the Invention

As has been described heretofore, according to the slotting milling cutter of the present invention, (1) since bottom grooves having a width of 90 to 100% of that of bottom edges are defined from the rake faces of the bottom edges toward the major flanks thereof; or (2) since bottom grooves having a width of 70 to 100% of that of bottom edges are defined from the rake faces of the bottom edges toward the major flanks thereof with an attack angle of 0° to 105°, in a blade body having a plurality of projected cutting blades formed in a comb shape; the slotting milling cutter exhibits a useful effect of forming excellent durable films by means of physical vapor deposition method to as deep as around troughs between projected cutting blades having a complicated configuration without sacrificing the strength of the blade bodies. It should be noted here that a $W/W_0$ ratio of $\leqq$0.8 in the micro finger joint cutter and that of $\leqq$0.9 in the long finger joint cutter according to this embodiment can secure the bottom edge, which can mill finger tips in wood materials, remaining on each side of each bottom groove.

What is claimed is:

1. Replaceable blade bodies for a slotting milling cutter rotatable about an axis comprising:

a plurality of adjacent projecting cutting blades integrally formed in a comb shape in the replaceable blade bodies;

said blade bodies each having a seating surface substantially parallel to the axis for seating the blades;

bottom edges formed at troughs between one of said plurality of adjacent projecting cutting blades and another of said plurality of adjacent projecting cutting blades adjacent thereto on the same plane as rake faces of the projecting cutting blades;

bottom grooves in the bottom edges having a width less than that of the bottom edges, said bottom grooves being a slant face with respect to said seating surface formed from a predetermined point toward the rake faces in the bottom edges diagonally toward major flanks thereof, respectively; and a coating of hard films by means of physical vapor deposition method on said replaceable blade bodies, thus further coating areas near the bottom edges with the hard films.

* * * * *

UNITED STATES PATENT AND TRADEMARK OFFICE
CERTIFICATE OF CORRECTION

PATENT NO. : 6,644,896 B2
DATED : November 11, 2003
INVENTOR(S) : Tomoyuki Iinuma It is certified that error appears in the above-identified patent and that said Letters Patent is hereby corrected as shown below:

Title page,
Item [62], Related U.S. Application Data, change "Division of application No. 09/600,024, filed on Jul. 7, 2000, now abandoned" to -- Division of application No. 09/600,024, filed as application No. PCT/JP99/00032 of January 8, 1999, now abandoned --

Signed and Sealed this

Nineteenth Day of July, 2005

JON W. DUDAS
*Director of the United States Patent and Trademark Office*